June 5, 1928.  1,672,461
P. H. LEHR
MOWER
Filed June 2, 1926   4 Sheets-Sheet 1
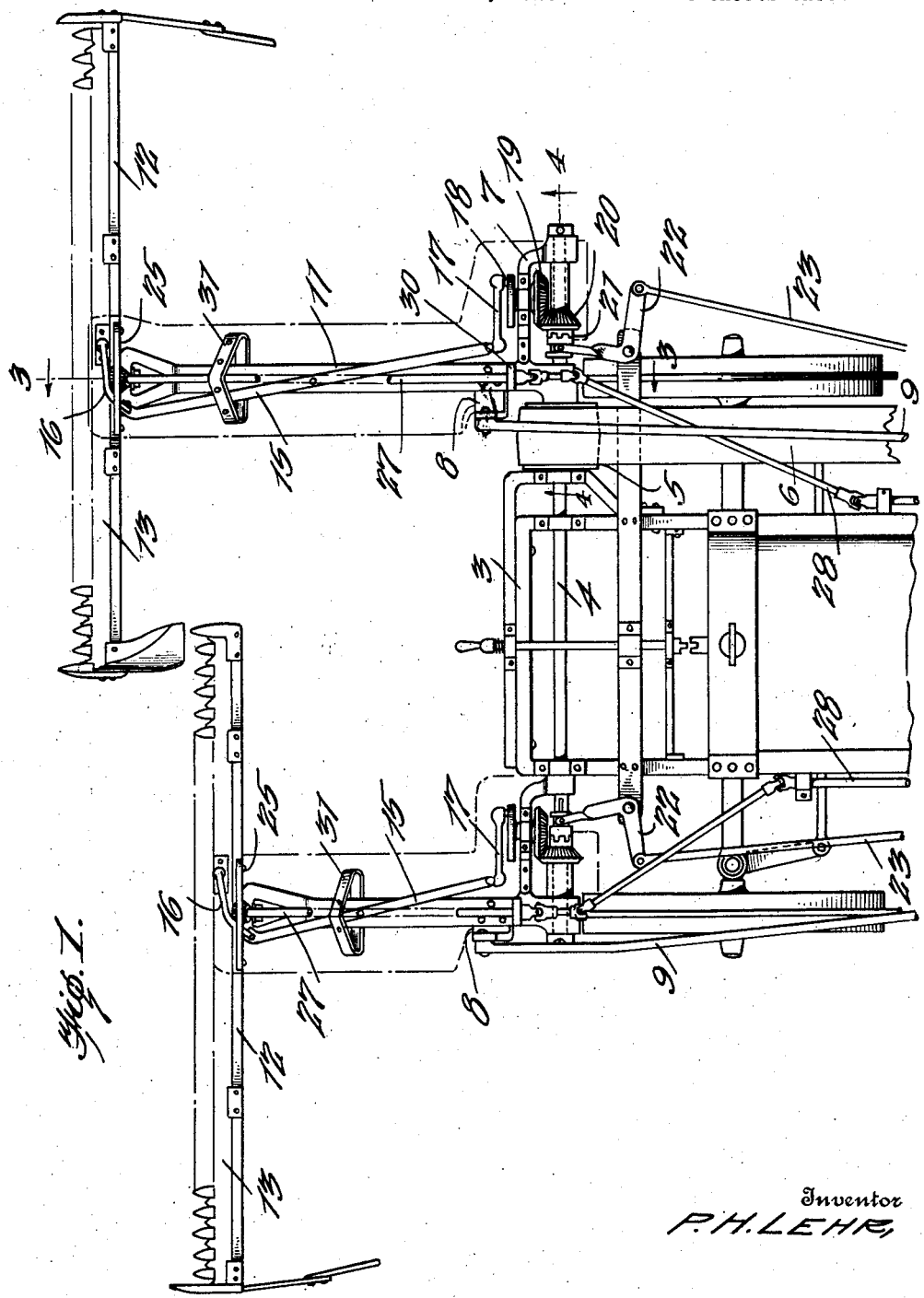
Inventor
P. H. LEHR,
By
Lacey & Lacey, Attorneys

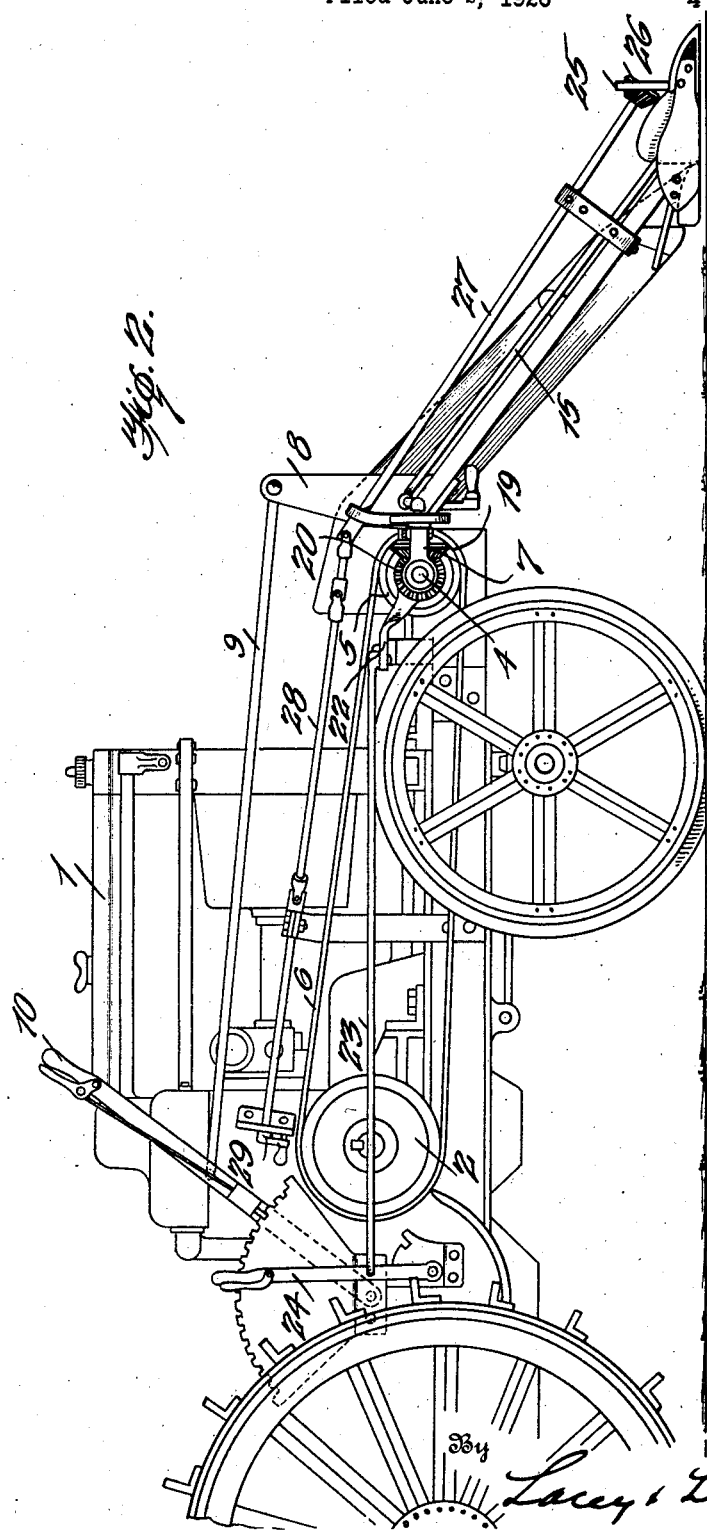

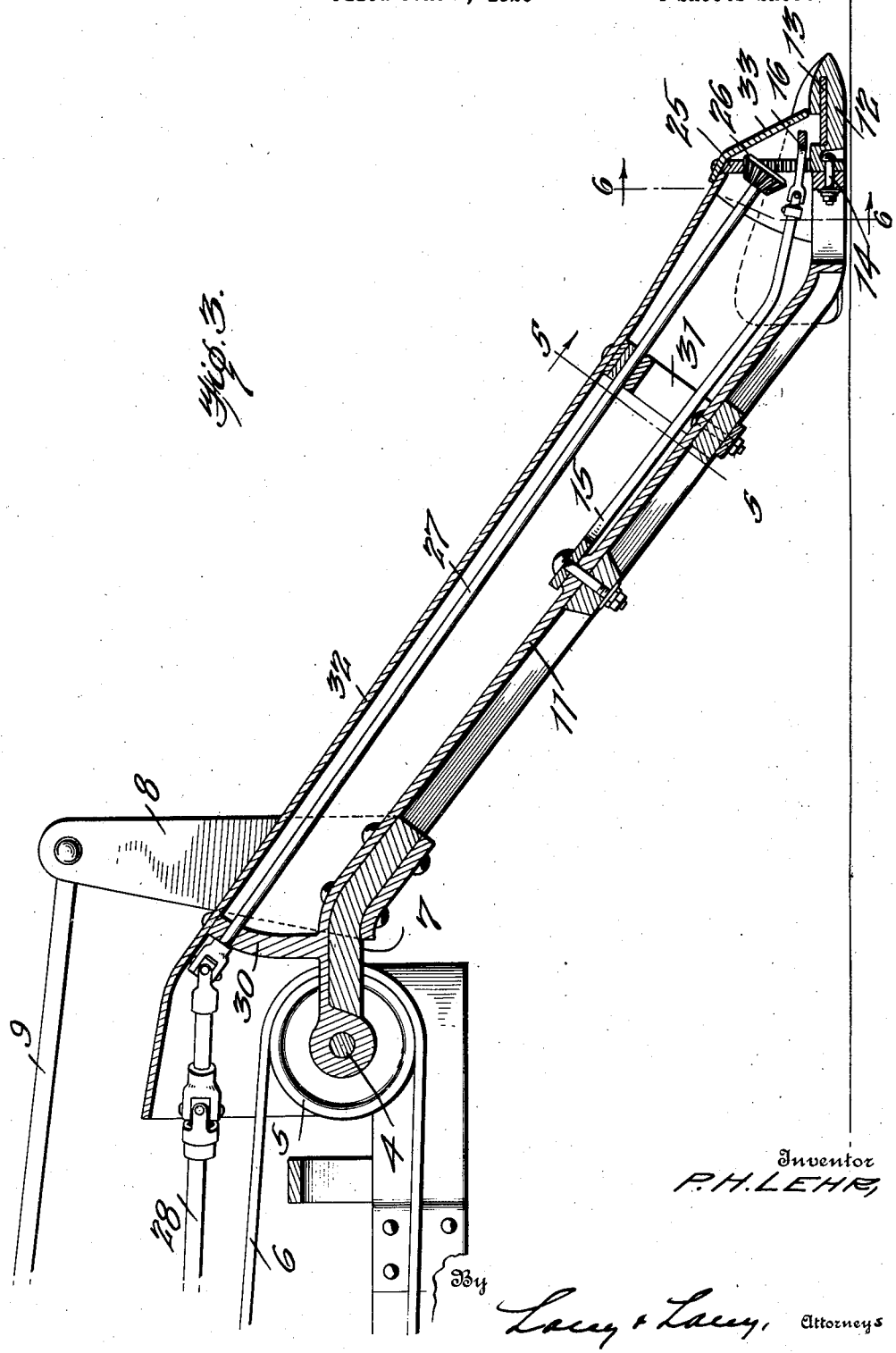

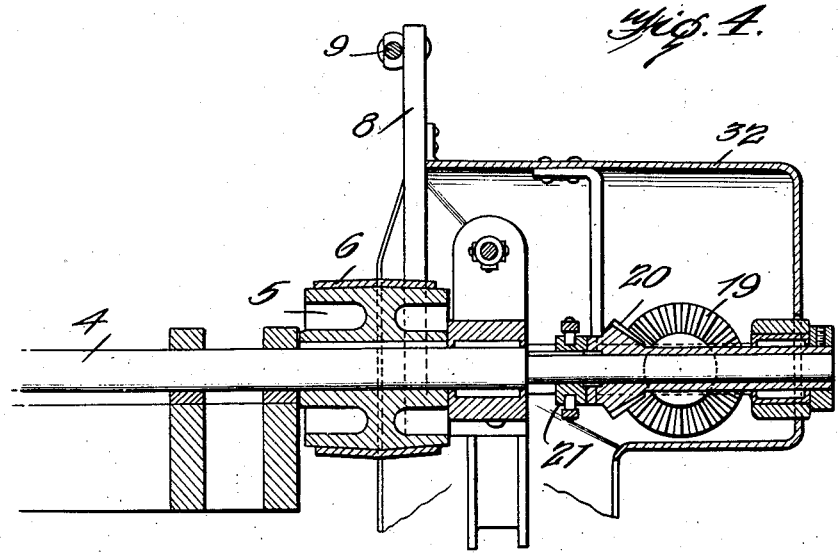
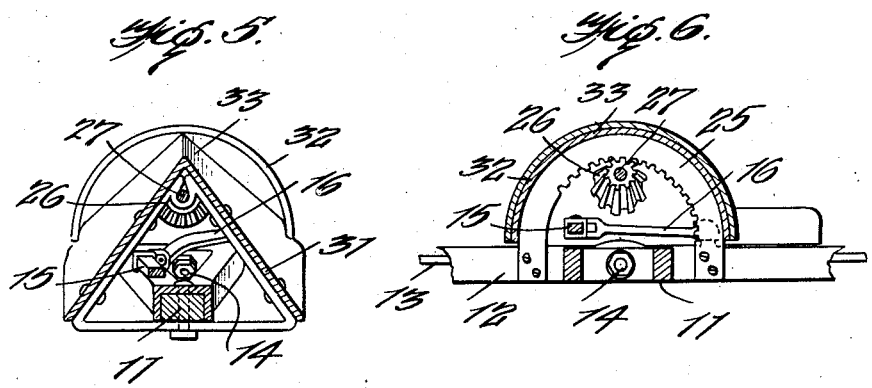

Patented June 5, 1928.

1,672,461

UNITED STATES PATENT OFFICE.

PHILIP HENRY LEHR, OF ST. JOSEPH, MISSOURI.

MOWER.

Application filed June 2, 1926. Serial No. 113,208.

The invention relates to mowing machinery and aims to provide a mechanism complete in itself or adapted to be applied to any type or make of tractor to be carried and operated thereby.

The invention contemplates two cutting mechanisms disposed side by side in advance of the tractor, the one slightly in front of the other, and adapted to be independently driven or thrown into or out of gear without stopping the tractor.

The invention furthermore aims to mount the cutting mechanisms so that either or both may be raised and adjusted to admit of the machine passing through a gate opening adapted to accommodate the tractor, said adjustment being effected from the driver's seat and without the necessity of stopping the tractor.
While the drawings illustrate a preferred embodiment of the invention, it is to be understood that in adapting the means to meet specific needs and requirements, the design may be varied and such other changes in the minor details of construction may be resorted to within the scope of the invention, as claimed, without departing from the spirit thereof.

For a full understanding of the invention and the merits thereof, reference is to be hand to the following description and the drawings hereto attached, in which,—

Figure 1 is a top plan view of a mowing mechanism embodying the invention, showing the same applied to the front portion of a tractor, Figure 2 is a side view of a tractor with mowing mechanisms applied thereto embodying the invention, Figure 3 is an enlarged detail sectional view on the line 3—3 of Figure 1, Figure 4 is an enlarged detail sectional view on the line 4—4 of Figure 1, Figure 5 is a detail sectional view on the line 5—5 of Figure 3 looking in the direction of the arrows, and, Figure 6 is a detail sectional view on the line 6—6 of Figure 3, looking in the direction of the arrows.

Corresponding and like parts are referred to in the following description and designated in the several views of the drawings by like reference characters.

The tractor illustrated is conventional and may be of any type or make and is shown to demonstrate the application of the invention. The numeral 1 designates the engine of the tractor and 2 the fly wheel or band pulley which is connected in any preferred way with the engine to be driven thereby. The numeral 3 designates a suitable frame which is connected to the chassis of the tractor and forms supporting means for the parts comprising the mower mechanism. A transverse shaft 4 is mounted in suitable bearings of the frame 3 and projects at opposite ends beyond the chassis of the tractor to admit of a mowing mechanism being fitted upon each of the projecting ends. A band pulley 5 is fast to the transverse shaft 4 and a drive belt 6 connects the pulley 5 with the fly wheel or pulley 2 to admit of said shaft being driven from the engine 1 of the tractor.

The mowing mechanisms mounted upon opposite ends of the transverse shaft 4 are similar, hence a detailed description of one will suffice for a full understanding of both. The cutting mechanism of one is located slightly in advance of the other, as shown most clearly in Figure 1, and the inner ends of the cutting mechanisms overlap so that when both mowing mechanisms are in action a clean swarth is cut of a length equal to the combined length of the two cutting mechanisms. The parts are so constructed and mounted as to admit of either one of the cutting mechanisms being elevated and thrown out of action to meet requirements and conditions of work. Corresponding parts are similarly designated, those upon one side of the tractor having a right hand arrangement and those upon the opposite side having a left hand arrangement, but in all other respects the parts are substantially the same in construction and arrangement.

A frame 7 is loosely mounted upon the shaft 4 and an arm 8 projects upwardly therefrom and is connected by means of a rod 9 to a level 10 conveniently mounted upon the tractor so as to be operated from the driver's seat or other determinate point from which the several control levers are manipulated. The arrangement is such that upon proper manipulation of the lever 10, the frame 7 may be turned about the shaft 4 to raise or lower the cutting mechanism carried thereby. An arm or extension 11 attached to the frame 7 projects forwardly and downwardly and receives the cutting mechanism which comprises the usual finger bar 12 and the sickle or cutter bar 13 which is slidably mounted upon the finger bar to receive a reciprocatory movement. The cutting mechanism is pivotally connected to the arm 11, as indicated most clearly at 14 in Figure 3, thereby admitting of the cutting mechanism adapting itself to rolling ground, as well as to be adjusted and turned to reduce the width of the machine so that it may pass through a gate opening of a width to accommodate the tractor.

For operating the cutting mechanism, a lever 15 is pivotally mounted intermediate its ends upon the arm or extension 11 of the frame 7 and a pitman 16 connects the lower front end of the lever 15 with the sickle or cutter bar 13. A pitman 17 connects the rear end of the lever 15 with a crank pin 18 of a shaft provided with a bevel gear 19 which is in mesh with a bevel gear 20 loose on the shaft 4. A clutch member 21 splined to the shaft 4 is adapted to be thrown into and out of gear with the bevel gear 20 and this clutch member 21 has connection with one arm of a bell crank 22, the other arm of said bell crank being connected by means of a rod 23 with a lever 24 which is conveniently mounted upon the tractor, so as to be readily accessible for operation when required. It will thus be understood that by manipulation of the lever 24 the cutting mechanism may be thrown into or out of gear, as required without necessitating the stopping of the machine, and it makes no difference whether the cutting mechanism is raised or lowered.

The cutting mechanism may be adjusted to adapt the same to the surface of the ground or to reduce the width of the mowing mechanism when moving from one place to another, or passing through a gate opening. An internally toothed bar 25 of semi-circular form is connected at its ends to the finger bar 12 of the cutting mechanism and its teeth are adapted to mesh with a bevel gear 26 fast to a shaft 27 which is journaled in bearings applied to the arm 11. A tumbling rod 28 connects the upper rear end of the shaft 27 with an operating member 29, which as shown, consists of a crank disposed so as to be within convenient reach of the driver. Rotation of the tumbling rod 28 effects a corresponding rotary movement of the shaft 27 and through the gear 26 and tooth bar 25 the cutting mechanism may be turned to suit the general character of the ground or occupy a position in the plane of the arm 11, so as not to project beyond the side of the tractor. The shaft 27 is mounted in bearings 30 and 31 applied to the arm or extension 11 of the frame 7 and a suitable housing 32 is attached to the bearings 30 and 31 and encloses the shaft 27, lever 15, and a portion of the tumbling rod 28, as indicated most clearly in Figure 3. The upper rear portion of the housing 32 is constructed to enclose the gearing 19 and 20, so as to protect the same. A V-shaped guard 33 is located forwardly of the internally toothed bar 25 and the adjacent connections and serves to divide the grain and prevent the same falling in the path of the wheels of the tractor to be crushed and otherwise injured. The upper rear portion of the guard 33 extends over the toothed bar 25 and overhangs the lower end of the housing 32, as shown most clearly in Figure 3 of the drawings.

It will be understood from the foregoing, taken in connection with the accompanying drawings, that the invention provides a mowing mechanism which may be applied to any make of tractor and which enables a wide swath to be cut and when required, one or the other, of the cutting mechanisms may be thrown out of action without necessitating the stopping of the machine when in motion. Upon operating the lever 10 the arm 11 may be raised or lowered and upon operating the crank 29 the cutting mechanism may be turned so as to lie in the plane of the arm 11 and thereby materially reduce the width of the machine so that it may pass through a gate opening adapted to accommodate the tractor. The cutting mechanism may be thrown into or out of gear by operating the lever 24 which through the connections herein referred to, throws the clutch member 21 into or out of engagement with the bevel gear 20.

It is observed that the cutting mechanism may be connected with any convenient or preferred part of the tractor to be driven therefrom, as found most advantageous, to meet existing conditions and the relative speed at which it is preferred to operate the mowing attachment.

Having thus described the invention, I claim:

1. In a mowing machine, the combination with a transversely disposed shaft, means for rotating the shaft, an arm pivoted on the shaft and means for pivotally adjusting the arm and holding it in the required adjusted position, of a cutting mechanism pivoted to the outer end of the arm, means for pivotally adjusting the cutting mechanism and securing it in the adjusted position, gearing partly mounted upon the said pivoted arm and partly mounted upon the transverse shaft, a lever mounted on the pivoted arm and connected to the cutting mechanism and gearing, and a clutch member splined to the transverse shaft and adapted to connect the said gearing thereto.

2. In a mowing machine, the combination with a transversely disposed shaft, means for rotating the shaft, an arm pivoted on the shaft and means for pivotally adjusting the arm and holding it in the required adjusted position, of a cutting mechanism pivoted to the outer end of the arm, an internally toothed curved bar secured at its ends to the cutting mechanism upon opposite sides of its pivotal connection with the said arm, a shaft mounted upon the arm and geared to the toothed bar, a lever pivoted intermediate its ends to the arm and having its forward end connected to the cutting mechanism, gearing mounted upon the transverse shaft and pivoted arm and connected to the rear end of the said lever, and means for throwing the gearing into and out of engagement with the transverse shaft.

3. In a mowing machine, the combination with a transversely disposed shaft, means for rotating the shaft, an arm pivoted on the shaft and means for pivotally adjusting the arm and holding it in the required adjusted position, of a cutting mechanism pivoted to the outer end of the arm, an internally toothed curved bar secured at its ends to the cutting mechanism upon opposite sides of its pivotal connection with the said arm, a shaft mounted upon the arm and geared to the toothed bar, a lever pivoted intermediate its ends to the arm and having its forward end connected to the cutting mechanism, gearing mounted upon the transverse shaft and pivoted arm and connected to the rear end of the said lever, means for throwing the gearing into and out of engagement with the transverse shaft, bearings on the arm for receiving the shaft thereon, a housing attached to the bearings and enclosing the shaft, lever and gearing, and a guard forwardly of the toothed bar and housing and overlapping the latter and attached to the said toothed bar.

4. In a mower the combination with a supporting frame, a transverse shaft thereon, means for rotating the shaft, arms pivotally mounted upon opposite ends of the shaft, and independent means for adjusting the arms and holding them in the required adjusted position, of a cutting mechanism pivoted intermediate its ends to the front end of each of the arms and arranged one in advance of the other with their inner ends overlapping, means on the frame and arms for adjusting the cutting mechanisms, gearing on the transverse shaft and pivoted arms including a clutch, connecting means between the said gearing and cutting mechanisms, and independent clutch operating means for throwing the cutting mechanisms into and out of gear.

In testimony whereof I affix my signature.

PHILIP HENRY LEHR. [L. S.]